United States Patent Office 3,832,158
Patented Aug. 27, 1974

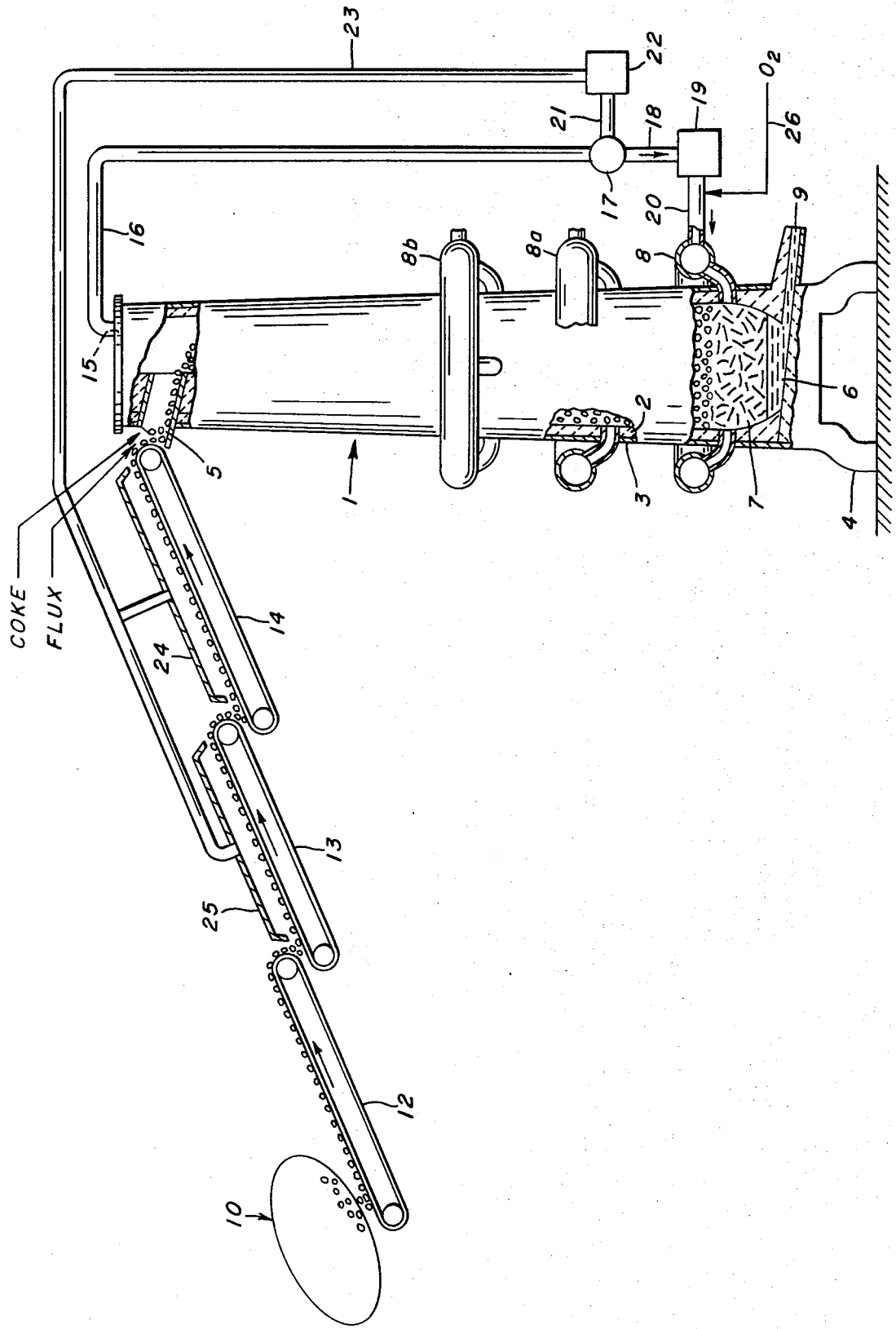

3,832,158
PROCESS FOR PRODUCING METAL FROM METAL OXIDE PELLETS IN A CUPOLA TYPE VESSEL
Richard F. Obenchain, 3340 Comanche Road, Pittsburgh, Pa. 15234
Filed May 31, 1973, Ser. No. 365,503
Int. Cl. C21b 13/00
U.S. Cl. 75—38                    15 Claims

ABSTRACT OF THE DISCLOSURE

Metal is produced from metal oxide in a cupola-type vessel by the reduction of carbon-containing metal oxide pellets. Following formation of a coke bed in a cupola-type vessel, alternate layers of metal oxide pellets, the pellets containing sufficient carbon to reduce the metal oxide of the pellet, and layers of coke are fed to the cupola-type vessel. Flux material is also added and, upon ignition of the coke bed, the metal oxide pellets are reduced in a self-contained system. The coke bed and the coke added to replenish the bed in alternate layers are used for the supplying of heat to the metal oxide carbon-containing pellets to initiate the reduction of the metal oxide therein, with the metal oxide reducing to molten metal which is then passed through the ignited coke bed, collected, and withdrawn from the cupola-type vessel at predetermined intervals or continuously. The carbon content of the resulting molten metal can be controlled by enriching the air fed to the coke bed with oxygen, with the oxidation of impurities and carbon being effected to produce a controlled carbon content metallic product.

BACKGROUND OF THE INVENTION

The use of a cupola vessel in the production of molten metal is well known. In such cupola operations, however, the charge comprises generally pig iron or steel scrap rather than iron ore. The remelting of such iron or steel scrap is effected by the use of an incandescent coke bed and the charging to the cupola of replenishing coke and the solid metallics which are to be melted. In the melting of the steel scrap or pig iron, air is introduced into the vessel through tuyeres, as in blast furnace, and the molten metal so produced is removed from the bottom of the cupola through a tap hole. In cupola operation, the metal normally produced is in the nature of a cast iron material containing two percent or more of carbon.

In a basic cupola operation, i e., those having basic slags, the sulfur content of the resulting metal is generally low while the metal so produced contains generally higher carbon contents. In an acid cupola operation, such operations generally result in a higher sulfur content in the resultant metal.

The charge to such cupolas, however, generally comprises pig iron or steel scrap, along with coke to replenish the bed and the desired fluxing materials, with little or no reduction of iron oxide materials being effected in the cupola vessel.

I have discovered that metal oxides may be processed in a cupola-type vessel to produce a molten metal with a significant reduction in the coke normally needed to reduce such oxides in a blast furnace. This improved process, especially suitable for iron oxide reduction to low carbon-content iron, is useful in reducing iron oxides that are normally considered as waste materials. Such iron oxides, in the form of iron ore fines, mill scale, and various metallurgical dusts are a problem to iron producers in that disposal of the same is difficult because of environmental restrictions, while charging of these wastes to a blast furnace normally results in their loss through the outlets of the furnace in view of their fine particle size. Some mills may produce as high as 10–20% of these fine materials, normally obtaining about 10% as iron fines and 8% or more as mill scale and other plant wastes. These materials, used in the present process, may be reclaimed with attendant economy and benefits to the ecology.

BRIEF DESCRIPTION OF THE INVENTION

The present invention relates to a process for the production of metal, such as iron, in a cupola-type vessel, the starting material for the process comprising carbon-containing metal oxide pellets. As in conventional cupola processes, a coke bed is formed in the cupola-type vessel and to the coke bed there are charged alternate layers of coke and pellets of metal oxide containing sufficient carbonaceous material to effect the reduction of metal oxide upon heating. Flux material is also added to the charge as desired. The coke bed is ignited and the incandescent coke, with combustion maintained through introduction of air through tuyeres, heats the pellets to a reducing temperature, the reduction using iron oxide being initiated at a temperature of 850–1500° F., and effects reduction of the iron oxide in the pellets by the carbonaceous material contained therein. By controlling the atmosphere to which the molten metal is exposed, the carbon content of the resultant moltent metal can be regulated, with carbon contents as low as 0.02% being produced. The metal oxide pellets charged to the cupola-type vessel may initially comprise cold bonded pellets, that is, pellets of metal oxide and carbonaceous material, which are bonded together without heating to a temperature which would destroy the carbonaceous material, with a binder. Following the initial charge to the cupola-type vessel, it is then possible to feed pellets which are formed on a pelletizing disc directly to the top of the cupola charge, without the need for high-strength bonding of the pellets. The pellets may be dried intermediate the pelletizing disc and cupola-type vessel or may be charged to the cupola-type vessel without drying and the pellets dried within the cupola-type vessel.

BRIEF DESCRIPTION OF THE DRAWING

The attached drawing schematically illustrates a cupola-type vessel and the process of the present invention wherein metal oxide, carbon-containing pellets are reduced to produce molten metal.

DETAILED DESCRIPTION

The present invention relates to the production of metal from metal oxide pellets in a cupola-type vessel. The general cupola vessel comprises a vertically extending generally cylindrical vessel, taller than it is wide, with a refractory lining, the cupola vessel having a charging door near the top thereof and tap holes for metal and slag adjacent to the bottom thereof. At the position where a coke bed is to be placed, there are tuyeres through which air is injected into the coke bed for ignition and combustion. As schematically illustrated in the attached drawing, the cupola vessel generally designated 1 has a refractory lining 2 within a shell 3 and may be supported on legs 4. At the upper portion of the cupola there is a trap door 5 for charging of material to the cupola. While adjacent the bottom, the hearth 6 supports a coke bed 7, the coke bed being ignited and combustion maintained by use of air which is introduced through tuyeres 8. A tap hole 9 is provided for the removal of molten metal from the cupola and a slag port, not shown, is also provided for removal of slag.

In conventional cupola use, the bed of coke is placed in the bottom thereof and made incandescent by ignition and maintaining of combustion of the coke by air fed through the tuyeres. Above the incandescent coke bed, layers of scrap or pig iron and layers of coke are fed to the cupola, with suitable fluxing materials where desired, and the incandescent coke serves to heat the pig iron or steel scrap to a melting temperature, with the molten metal flowing through the coke bed and intermittently removed from the tap hole. The coke which is fed to the cupola charge along with the scrap or pig iron, passes generally downwardly therewith and replenishes the coke bed so as to maintain a heat source for melting of the metal.

In contrast to general cupola practices, the present invention relates to the reduction of metal oxides within a cupola-type vessel, the metal oxides being in the form of pellets, the pellets containing therein sufficient carbonaceous material to effect reduction of the metal oxide.

The pellets usable in the present process are formed preferably on a pelletizing disc by admixing a metal oxide material and a carbonaceous material, which pellets may be formed with or without a binder. The metal oxide may be in the form of a natural ore, a reclaimed metal oxide, or other form. The process is usable for reducing chrome concentrates and other chromium sources such as chrome oxide or chrome ore to ferro-chrome; for reducing manganese ores to ferro-manganese; but, is especially suited for the reduction of iron oxide to metallic iron. The following detailed description will thus use iron oxide reduction for the purpose of brevity, but other metal oxides could be used. The term iron oxide, as used herein, designates crushed iron ore or iron ore fines and includes other iron oxide materials such as waste materials from steel plant processing, including mill scale, blast furnace dust, open hearth dust, electric furnace dust, and the like.

To the iron oxide material there is added a carbonaceous material in an amount of 5 to 30%, the amount of carbonaceous material added being sufficient to effect the complete reduction of the iron oxide in the pellets. The carbonaceous material may comprise finely divided coal, coke, petroleum coke, plant wastes such as coke breeze, or other suitable carbonaceous material which will effect reduction of the iron oxide. To the carbonaceous material and the iron oxide there may be added a binder material which will bind the particles together and provide crush strength for the pellets. The use of a binder material such as a cementitious material, either Portland Cement, slag cement, lime, hydraulic lime and other binding agents, is preferred where the pellets will be subjected to shock or impact and provides sufficient strength to the pellets to prevent breakage or attrition of the pellets. In arrangements where the pellets may be fed directly from a pelletizing disc to an initial charge in a cupola-type vessel, where there is no significant dropping of the pellets or other action which could cause breakage, the pellets may be formed without such a binder. A fluxing agent may also be added to the pellet if desired.

The iron oxide material and carbonaceous material are crushed to a particle size such that at least about 50% of the particles pass through a —325 mesh screen to provide for intimate mixing and contact of the iron oxide with the carbonaceous material within the pellet.

As in conventional pelletizing, the above-described materials, the iron oxide, carbonaceous material, and cementitious material, if desired, are formed into balls with the addition of about 6 to 15% by weight of water, and pellets formed on the order of a size of one-quarter to one and one-quarter inch in diameter, with pellets on the order of seven-eighths of an inch in diameter being preferred. The iron oxide and carbonaceous material, rather than being pelletized may be formed into briquettes, if desired.

In the present process, as in conventional cupola processes for melting of pig iron or scrap, a coke bed is formed and alternate layers of material for forming of molten metal and coke, with flux when desired, are added to the cupola-type vessel. Flux materials for use in the process are those conventional flux materials such as lime or limestone, dolomite, sodium carbonate, fluorspar, and the like. Also, a minor amount of scrap or pig iron may be added to the charge without adversely affecting the process.

Upon formation of the coke bed in the cupola-type vessel, the vessel is then charged with alternate layers of iron oxide pellets containing carbonaceous material and layers of coke, with the flux material added as desired. In the initial charge to the cupola-type vessel, where pellets fed to the cupola-type vessel would fall and be subjected to impact upon reaching the level of previous layers of material therein, it is required that the pellets have sufficient impact strength to prevent breakage or attrition of the pellets. In the initial loading of the cupola-type vessel, pellets which are bonded with a binder and which have a crush strength of about 50 pounds per square inch or more are used. With this initial charge present in the cupola-type vessel, the coke bed is ignited and air is introduced so as to effect combustion of the coke bed forming an incandescent coke layer. The heat provided by the coke bed heats pellets adjacent thereto and causes reaction of the iron oxide of the pellets with the carbonaceous material contained therein. This reaction involves the reduction of the iron oxide particles by the carbonaceous particles in intimate contact therewith, with evolution of carbon monoxide, until the iron oxide is reduced and forms molten iron. The molten iron so formed then passes through the coke bed and is collected in the bottom of the cupola-type vessel and discharged at predetermined intervals, or continuously.

Upon heating of the initial charge and the reduction of iron oxide pellets in the lower portion of the vessel, the charge will descend to an extent that subsequent alternate layers of iron oxide pellets, coke material, and flux may be added to the top of the vessel to form a continuous process. After the initial charge has been fed to the cupola-type vessel and the reaction initiated, the descending bed of charge material can be replenished adjacent the top of the cupola-type vessel with iron oxide pellets containing carbonaceous material that do not require a binder in view of the fact that such pellets may be fed to the cupola without any significant fall or drop within the vessel.

Additional tuyeres 8a and 8b are provided above the position of the tuyeres 8 so as to provide for the introduction of oxidizing gases to aid in combustion and heating of the pellets in the cupola-type vessel above the coke bed. Also, combustion gases from the burning of natural gas or other fuel may be injected into the cupola-type vessel 1 through these tuyeres. Supplemental fuels which may be introduced through the tuyeres 8, 8a or 8b include petroleum, natural gas, powdered coal, and the like.

As illustrated in the attached drawing, green pellets may be formed on a pelletizing disc 10 and the pellets transferred to a conveyor system for feeding directly into the cupola-type vessel. The pellets 11 are transferred to a conveyor 12 which then feeds the pellets to subsequent conveyors 13 and 14. These pellets which are fed to the cupola-type vessel subsequent to the initial charging thereof comprise iron oxide pellets containing carbonaceous material and do not require any binder. Some drying may be effected intermediate the pelletizing disc and the cupola-type vessel but, with the initial charge within the vessel and the hot gases flowing upwardly through the vessel, the pellets may be charged to the vessel without significant drying and the drying being carried out in the top portion of the vessel.

During the reduction of the iron oxide in the pellets, the carbonaceous material effects the reduction and forms carbon monoxide and carbon dioxide, which then passes upwardly through the cupola-type vessel. These hot gases may be discharged from the cupola-type vessel through an orifice 15 and carried by conduit 16 for use in preheating of air which is being fed to the tuyeres. As illustrated on the schematic drawing, the carbon monoxide containing off-gases from the cupola pass through conduit 16, through valve 17 and conduit 18, to a heat transfer unit wherein incoming air to the tuyeres through conduit 20 may be preheated to a temperature as high as 2600° F. to provide a hot blast for the cupola-type vessel. As an alternate, as illustrated, the carbon monoxide containing gases from conduit 16 may be directed by valve 17 to a further conduit 21 into a heat transfer unit 22, which heat transfer unit may be used to produce steam or for other heating purposes. Also, the heated air so produced may be passed through conduit 23 and may be directed to hoods 24 and 25 over conveyors for green pellets, and such preheated air used for drying of pellets prior to introduction into the cupola-type vessel, or the carbon monoxide-containing gases may be passed directly to the hoods 24 and 25 to assist in curing of the pellets, where desired.

When the cupola-type vessel is operated under acidic conditions, i.e., where an acidic slag is produced, the sulfur content of the iron produced is higher than where basic slags are used. In order to remove such sulfur from the iron, desulfurizing agents, such as soda ash, sodium carbonate, or calcium carbide, may be added to the charge and desulfurization effected within the cupola-type vessel. Or, the iron resulting from the process may be subsequently treated with desulfurizing agents following discharge from the cupola-type vessel.

An important aspect of the present invention resides in the ability to introduce oxygen as illustrated in the schematic drawing through line 26 into the air being fed to the tuyeres through line 20 and enrich such air, which enrichment enables a controlled carbon content of the molten metal to be effected. If desired, the air may be completely replaced by oxygen. It has been found that by regulating the oxygen content of the air being fed through the tuyeres, the reduction of the iron oxide in the pellets is effected and carbon which is absorbed by the molten metal so produced can be oxidized by the oxygen supplied with the air, and molten metal with carbon content as low as 0.02 to 4% carbon can be produced. As oxygen is fed to the air being fed to the tuyeres, such oxygen, in addition to providing oxygen for the combustion of the coke in the incandescent bed, also oxidizes certain impurities which are picked up by the molten metal, such as silicon, manganese and carbon, the relative rate of oxidation of these impurities being in that order. While oxidation of iron may also be effected by the presence of too much oxygen within the system, the carbon content of the iron may be reduced because of the oxidation of carbon prior to or in preference to iron oxidation, so that by use of a controlled oxygen enrichment, oxidation of carbon in the iron is effected prior to oxidation of the metallic iron itself, and the carbon content of the iron so produced is controlled to a predetermined value.

Other steps for carbon control in the iron produced may be used, such as adjustment of the carbon content of the pellet or exposing the hot metal produced during the process to an oxidizing atmosphere for a predetermined time. For example, the hot iron can be exposed to a slightly oxidizing atmosphere, such as a gaseous mixture of $CO_2$/CO where the ratio is greater than 1:1, upon tapping the hot iron from the furnace.

The use of iron oxide pellets containing carbonaceous material enables the production of molten iron in a cupola-type vessel with a significant lowering of the coke requirements for a specified amount of molten iron produced. For example, in conventional blast furnace reduction processing, about 1200 pounds of coke are required to produce a ton of molten iron from iron oxide. In the present process, the amount of carbonaceous material needed is less than one-half of the coke requirements for reduction as is used by the blast furnace. Significant savings are thus produced because of the expense involved in coke production. Also, the lowering of the coke supply necessary lessens the effect of such coke production upon the environment, where the pollution resulting from the coke production is now a factor.

The process described herein thus enables the production of iron containing as low as 0.02% carbon from iron oxide pellets containing carbonaceous material in a cupola vessel.

I claim:

1. A process for the production of metal from metal oxide in a cupola-type vessel comprising:

forming a coke bed in a cupola-type vessel;

charging to the cupola-type vessel containing said coke bed a charge of coke and metal oxide, the coke being sufficient to maintain said coke bed during operation of the cupola-type vessel, the metal oxide being in the form of pellets of solid metal oxide containing solid carbonaceous material in an amount sufficient to effect complete reduction of said metal oxide;

charging sufficient flux material, interspersed among said charge to effect slagging;

igniting said coke bed and introducing air thereto to heat the pellets to reducing temperature and effect reduction of the solid metal oxide in the pellets by the carbonaceous material contained therein and form molten metal which flows downwardly through said coke bed, and collecting said molten metal and discharging said molten metal produced by said reduction from said cupola-type vessel.

2. The process as defined in Claim 1, wherein said pellets are formed from a metal oxide and a carbonaceous material and are bonded by a binder to provide sufficient strength to the pellets to permit charging of the pellets to the cupola-type vessel without significant breakage or attrition.

3. The process as defined in Claim 1, wherein the pellets of an initial charge to said cupola comprise metal oxide and a carbonaceous material and are bonded by a binder and wherein charges of pellets to said cupola-type vessel subsequent to the initial charge, comprise pellets of metal oxide and carbonaceous material having no appreciable amount of binder added thereto.

4. The process as defined in Claim 3, wherein said pellets of metal oxide and carbonaceous material are pelletized and fed directly to said initial charge in the cupola-type vessel.

5. The process as defined in Claim 4, wherein said pellets are dried intermediate the steps of pelletizing and charging to the cupola-type vessel.

6. The process defined in Claim 4, wherein off gases from said cupola-type vessel contain carbon monoxide and said carbon monoxide-containing gases are burned to preheat air and wherein said air so preheated is used to dry said pellets.

7. The process defined in Claim 1, wherein said air introduced into said ignited coke bed is enriched with oxygen.

8. The process defined in Claim 7, wherein the metal oxide is iron oxide and the molten iron discharged from said cupola-type vessel contains 0.02 to 4% carbon, and wherein the carbon content of said iron is controlled by regulating the amount of oxygen added to said air.

9. The process defined in Claim 1, wherein a supplemental fuel is introduced with said air.

10. The process defined in Claim 1, wherein off gases from said cupola-type vessel contain carbon monoxide and said carbon monoxide-containing gases are burned to preheat air being introduced into said coke bed.

11. The process defined in Claim 1, wherein off gases from said cupola-type vessel contain carbon monoxide and said carbon monoxide-containing gases are used as a heat source outside of said vessel.

12. The process defined in Claim 1, wherein air is introduced into said charge, above said coke bed in the cupola-type vessel, to aid in combustion and heat said pellets.

13. The process defined in Claim 12, wherein said air is enriched with oxygen.

14. The process defined in Claim 1, wherein said air is replaced by oxygen.

15. The process defined in Claim 1, wherein a minor amount of scrap metal is added to said charge.

References Cited
UNITED STATES PATENTS

| | | | |
|---|---|---|---|
| 2,333,417 | 11/1943 | Duffield | 75—41 |
| 1,945,341 | 1/1934 | Brassert | 75—41 |
| 1,997,603 | 4/1935 | Spalding | 75—41 |
| 2,051,383 | 8/1936 | Lennings et al. | 75—41 |
| 3,652,069 | 3/1972 | Worner | 75—40 |
| 3,634,069 | 1/1972 | Worner | 75—41 |
| 3,634,065 | 1/1972 | Worner | 75—46 |

L. DEWAYNE RUTLEDGE, Primary Examiner

M. J. ANDREWS, Assistant Examiner